Patented Apr. 19, 1949

2,467,912

UNITED STATES PATENT OFFICE 2,467,912

MODIFIED DRYING OILS AND PROCESS OF MAKING SAME

John B. Rust, Verona, N. J., assignor to Montclair Research Corporation, a corporation of New Jersey No Drawing. Application September 29, 1943, Serial No. 504,294

13 Claims. (Cl. 260—404.8)

The present invention relates to modified drying and semi-drying oil products and the process of making them.

It is an object of this invention to enhance the air drying speed, baking rate and reactivity of unsaturated oils. It is also an object to increase the unsaturation of the oils and to so modify their properties as to produce oils of better resistance to weathering and the like. Other objects will appear hereinafter.

It is known that linseed, or other drying oil, may be bodied by reacting it with a small proportion of olefinic-alpha-beta-dicarboxylic acid, such as maleic anhydride. Such a modified oil may be further reacted with a polyhydric alcohol. Modification of oil in this manner is usually accompanied by a darkening of the oil.

I have now found that greatly improved drying oils may be obtained by the reaction of such oils with an alkenyl ester of an olefinic-alpha-beta-dicarboxylic acid. Some of the unsaturated alcohol esters which may be employed as modifiers of the present invention are diallyl maleate, diallyl fumarate, dimethallyl maleate, allyl acid maleate, allyl ethyl maleate, diallyl itaconate, dicrotyl maleate, methallyl methyl itaconate, diallyl citraconate, dipropargyl maleate, and the like.

The unsaturated alcohol esters of olefinic-alpha-beta-dicarboxylic acids of the present invention are heated with the drying or semi-drying oil at an elevated temperature of, for instance, 280° C. A combination occurs with the oil, accompanied by substantial lightening and thickening of the oil. Due to the unsaturated nature of the drying oil, copolymerization of the unsaturated ester of the unsaturated acid undoubtedly occurs both through the unsaturation of the acid as well as that of the alcohol radical. Thus in some cases, for instance, with diallyl fumarate, copolymerization with the drying oil may occur in three places, making for a rapid bodying oil of enhanced reactivity.

I usually employ about 5% of unsaturated ester of unsaturated acid but 1% or more is satisfactory up to more than 20% based on the drying oil. The amount of unsaturated diester depends upon the degree of modification desired. I have found that the modified oils of the present invention have greatly enhanced color stability, especially when used in baking enamels. The color of the treated oil is usually substantially lighter than that of the untreated oil.

As the oils of the present invention I may employ China-wood oil, oiticica oil, linseed oil, soya bean oil, perilla oil, sunflower oil, and the like.

The following examples are illustrative of the process of the present invention and the products which are obtainable. All proportions are in parts by weight.

*Example 1.*—50 parts of raw linseed oil were mixed with 2.5 parts of diallyl maleate. The mixture was heated to 235° C. A gelatinous mass appeared in the oil and was due to highly unsaturated constituents and protein constituents (foots) of the unrefined linseed. The temperature was taken to 290° C. for one hour. The oil was cooled and filtered. An extremely viscous, pale colored oil was obtained. This oil was compared in gelling time with a 5% maleic anhydride modified linseed oil and the glyceride thereof. The gelling time was substantially the same and was much more rapid than the untreated oil. The gel obtained from the modified oil of the present example was a very pale yellow compared to the brown and dark brown of the untreated oil and maleic-modified oil, respectively.

*Example 2.*—114 parts of alkali refined linseed oil were mixed with 5.7 parts of diallyl maleate and heated to 274°–280° C. for 2½ hours. The color of the treated oil was substantially lighter than even the original refined oil. Considerable body was obtained during this treatment. As a further illustration, 107 parts of refined linseed oil were mixed with 10.7 parts of diallyl maleate and heated at 275°–280° C. for 2½ hours. A pale yellow oil which was lighter than the original oil was obtained. More body was obtained in this case than when 5% of diallyl maleate was used.

*Example 3.*—132 parts of alkali refined soya bean oil were mixed with 6.6 parts (5%) and 13.2 parts (10%) respectively of diallyl maleate. The two samples were heated to 200° C. for 2½ hours. A bleaching of the already very light-colored oil was observed in both cases. Good body was achieved, more viscosity increase being noted in the 10% modified oil than with the 5% oil.

*Example 4.*—114 parts of refined linseed oil were mixed with 5.7 parts of diallyl fumarate and heated to 290°–300° C. for 2 hours. During this treatment the oil lightened considerably in color and increased greatly in viscosity. The viscosity increase was greater than that noted with diallyl maleate under similar treatment.

*Example 5.*—100 parts of refined linseed oil were mixed with 6 parts of dimethallyl maleate and heated to 285°–290° C. for 2 hours. A very pale colored oil of increased body was obtained.

*Example 6.*—100 parts of raw perilla oil and 7 parts of diallyl fumarate were mixed and heated at 220° C. for 30 minutes, then at 270° C. for 30 minutes. The oil was cooled slowly to yield a pale colored, very viscous product.

*Example 7.*—46 parts of refined linseed oil were mixed with 23 parts of diallyl fumarate and the mixture heated very slowly up to 310° C. Rapid bodying occurred and the reaction product was quickly cooled to room temperature. A pale yellow barely pourable material resulted. 64 parts of this material were dissolved in 40 parts of xylene and 1.3 parts of a 33⅓% solution of lead-cobalt naphthenate drier added. A film of this varnish was poured on metal and glass plates and baked for ½ hour at 135° C. A pale colored, highly flexible, yet tough film resulted.

As may be seen from the latter example, I may employ relatively large amounts of unsaturated ester to modify the drying oils of the present invention. When using such large amounts, it is possible to prepare rapidly drying varnishes from relatively slow drying oils such as soya bean oil or linseed oil. Such varnishes appear to dry in as short a time as many types of China-wood oil varnishes. Such varnishes also have excellent resistance to weathering, to water, to aqueous acids and alkalies and the like.

I claim:

1. A reaction product of a drying oil with 1 to 5% by weight of ester consisting of an unsaturated alcohol ester of an olefinic-alpha-beta-dicarboxylic acid, said unsaturated alcohols being selected from the class consisting of allyl, methallyl, crotyl and propargyl alcohols.

2. A reaction product of a drying oil and 1 to 5% by weight of diallyl maleate.

3. A reaction product of a drying oil and 1 to 5% by weight of diallyl fumarate.

4. A reaction product of a drying oil and 1 to 5% by weight of dimethallyl maleate.

5. A reaction product of linseed oil and 1 to 5% by weight of ester consisting of an unsaturated alcohol ester of an olefinic-alpha-beta-dicarboxylic acid, said unsaturated alcohols being selected from the class consisting of allyl, methallyl, crotyl and propargyl alcohols.

6. The process of improving the drying and bodying properties of a drying oil which consists in heating a drying oil with 1 to 5% by weight of ester consisting of an unsaturated alcohol ester of an olefinic-alpha-beta-dicarboxylic acid, said unsaturated alcohols being selected from the class consisting of allyl, methallyl, crotyl and propargyl alcohols.

7. The process of improving the drying and bodying properties of a drying oil which consists in heating a drying oil with 1 to 5% by weight of diallyl maleate.

8. The process of improving the drying and bodying properties of a drying oil which consists in heating a drying oil with 1 to 5% by weight of diallyl fumarate.

9. The process of improving the drying and bodying properties of a drying oil which consists in heating a drying oil with 1 to 5% by weight of dimethallyl maleate.

10. The process of improving the drying and bodying properties of linseed oil which consists in heating linseed oil with 1 to 5% by weight of ester consisting of an unsaturated alcohol ester of an olefinic-alpha-beta-dicarboxylic acid, said unsaturated alcohols being selected from the class consisting of allyl, methallyl, crotyl and propargyl alcohols.

11. A reaction product of China-wood oil and from 1 to 5% by weight of an ester consisting of an unsaturated alcohol ester of an olefinic-alpha-beta-dicarboxylic acid, said alcohol being selected from the class consisting of allyl, methallyl, crotyl and propargyl alcohols.

12. A reaction product of oiticica oil and from 1 to 5% by weight of an ester consisting of an unsaturated alcohol ester of an olefinic-alpha-beta-dicarboxylic acid, said alcohol being selected from the class consisting of allyl, methallyl, crotyl and propargyl alcohols.

13. A reaction product of a drying oil having conjugated unsaturation and 1 to 5% by weight of an ester consisting of an unsaturated alcohol ester of an olefinic-alpha-beta-dicarboxylic acid, said alcohol being selected from the class consisting of allyl, methallyl, crotyl and propargyl alcohols.

JOHN B. RUST.

REFERENCES CITED

The following references are of record in the file of this patent:

UNITED STATES PATENTS

| Number | Name | Date |
|---|---|---|
| 2,249,768 | Kropa | July 22, 1941 |
| 2,275,843 | Clocker | Mar. 10, 1942 |
| 2,304,288 | Swain | Dec. 8, 1942 |
| 2,306,281 | Rust | Dec. 22, 1942 |
| 2,312,731 | Salathiel | Mar. 2, 1943 |
| 2,341,060 | Price | Feb. 8, 1944 |